No. 785,678. PATENTED MAR. 21, 1905.
G. NEWLAND.
AUXILIARY JOURNAL FOR AXLES.
APPLICATION FILED SEPT. 13, 1904.
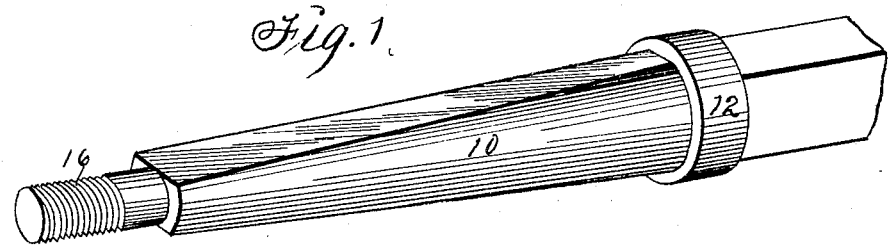
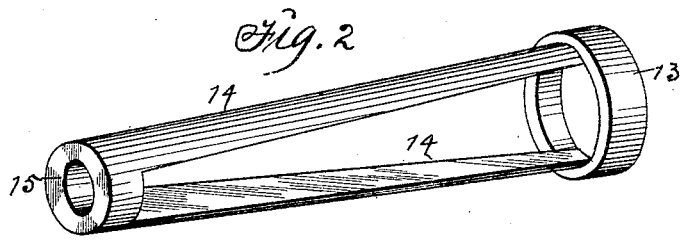
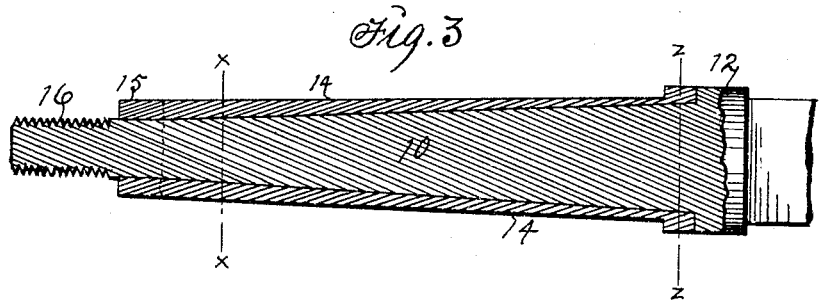
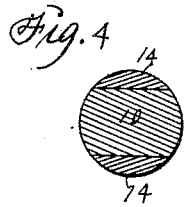
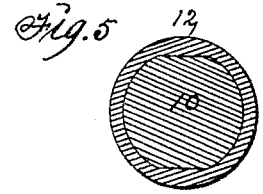
Witnesses:
L. L. Leibrock
R. H. Orwig
Inventor: Grant Newland
By Thomas G. Orwig, Attorney.

No. 785,678. Patented March 21, 1905.

UNITED STATES PATENT OFFICE.

GRANT NEWLAND, OF PANORA, IOWA, ASSIGNOR OF ONE-THIRD TO JOHN W. DALZELL AND ONE-THIRD TO IRA E. DALZELL, OF PANORA, IOWA.

AUXILIARY JOURNAL FOR AXLES.

SPECIFICATION forming part of Letters Patent No. 785,678, dated March 21, 1905.

Application filed September 13, 1904. Serial No. 224,353.

*To all whom it may concern:*

Be it known that I, GRANT NEWLAND, a citizen of the United States, residing at Panora, in the county of Guthrie and State of Iowa, have invented a new and useful Auxiliary Journal for Axles, of which the following is a specification.

My object is to provide an improved axle-skein or auxiliary journal to prevent the wear and damage incident to the journals and shoulders of vehicle-axles and the expense of repairing by truing them by means of a lathe.

My invention consists in the construction and combination of an auxiliary journal of specific form with an axle-journal, as hereinafter set forth, pointed out in my claims, and illustrated in the accompanying drawings, in which—

Figure 1 is a perspective view of the journal of an axle provided with two flat faces, and thereby adapted to receive the auxiliary journal as required to prevent the auxiliary journal from rotating. Fig. 2 is a perspective view of the auxiliary journal adapted to be detachably connected with the journal on the end of the axle. Fig. 3 is a longitudinal sectional view that shows the auxiliary journal in position on the axle-journal as required for practical use. Fig. 4 is a transverse sectional view on the line $x$ $x$ of Fig. 3, and Fig. 4 a corresponding view on the line $z$ $z$ of the same Fig. 3.

The numeral 10 designates the journal on the end of an axle that is made flat its entire length at two places on its tapering circumference from its shoulder 12 to its small end, as shown.

The auxiliary journal consists of a ring 13, adapted to engage the shoulder 12 on the axle, and 14 represents mating tapering integral extensions from the ring flat inside and convex outside and adapted to overlie the flattened sides of the journal 10, and their front ends are connected by an integral collar 15, adapted to slip over the screw 16 on the end of the journal 10 as required to produce a complete journal that will fit in the boxing in a hub that is designed to rotate on the auxiliary journal and axle-journal.

Having thus set forth the purpose of my invention and its construction and manner of forming and combining the auxiliary journal with an axle-journal, the practical utility thereof will be readily understood by blacksmiths and others conversant with the art to which it pertains.

What I claim as new, and desire to secure by Letters Patent, is—

1. An auxiliary journal for axles consisting of a ring, two mating and tapering integral extensions from the ring, flat on their inside faces and convex on their outside faces and connected at their small and front ends by an integral collar, as shown and described.

2. An auxiliary journal for axles consisting of a ring, two mating and tapering integral extensions from the ring, flat on their inside faces and convex on their outside faces and connected at their small and front ends by an integral collar, in combination with an axle-journal having two flat faces extended from end to end, as shown and described.

GRANT NEWLAND.

Witnesses:
J. P. NOLAND,
H. A. PORCHET.